No. 682,972. Patented Sept. 17, 1901.
J. CALDWELL.
HORSE HITCHER.
(Application filed June 22, 1901.)
(No Model.) 2 Sheets—Sheet 1.

Witnesses:
Arthur McArthur
H. C. Rodgers

Inventor:
Jack Caldwell
By Fischer & Thorpe attys.

THE NORRIS PETERS CO., PHOTO-LITHO., WASHINGTON, D. C.

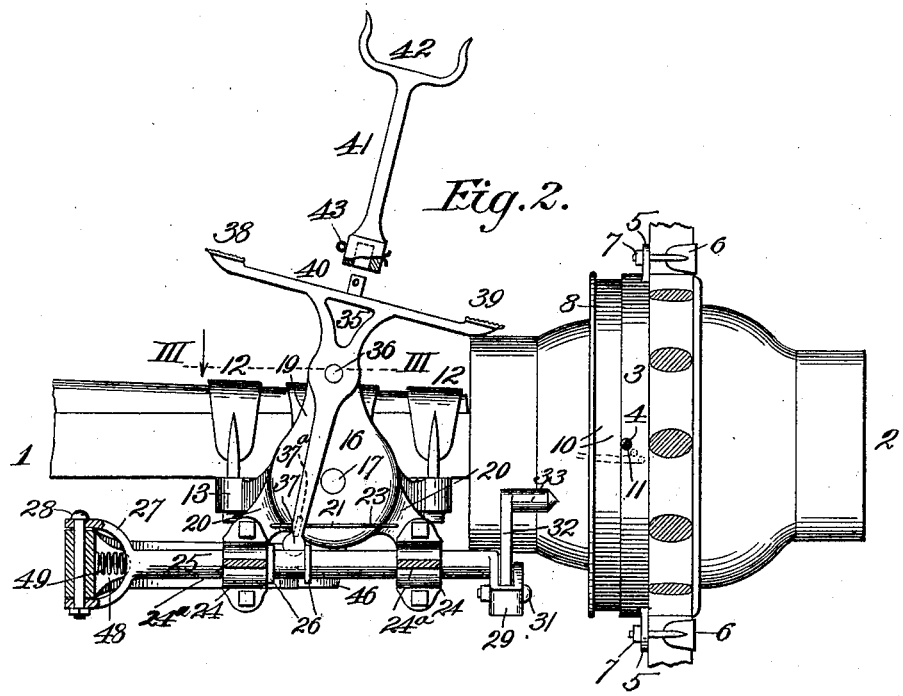

UNITED STATES PATENT OFFICE.

JACK CALDWELL, OF KANSAS CITY, MISSOURI, ASSIGNOR TO THE PERFECTION HITCHER MANUFACTURING COMPANY, OF SAME PLACE.

HORSE-HITCHER.

SPECIFICATION forming part of Letters Patent No. 682,972, dated September 17, 1901.

Application filed June 22, 1901. Serial No. 65,537. (No model.)

*To all whom it may concern:*

Be it known that I, JACK CALDWELL, a citizen of the United States, residing at Kansas City, in the county of Jackson and State of Missouri, have invented certain new and useful Improvements in Horse-Hitchers, of which the following is a specification.

My invention relates to horse-hitchers of that class adapted to be thrown in or out of operative position by the driver when in the vehicle; and my object is to produce an apparatus of this character which is of proper construction for quick and easy application to all animal-drawn vehicles, single or double, which embody two or more wheels connected by a transverse axle without regard to the peculiarities of form of the vehicle or the axle or the length of the inner portions of the hub-sleeves.

A further object is to produce an apparatus of the type mentioned whereby the animal or animals are effectually deterred from moving when hitched and checked almost instantly in case of a runaway if the driver is unable to control them in the usual manner.

A still further object is to guard against the apparatus being accidentally thrown into or out of operative position and to produce a structure practically noiseless, of inconspicuous but ornamental appearance, and which is simple, strong, durable, and cheap.

With these general objects in view the invention consists in certain novel and peculiar features of construction and combinations of parts, as hereinafter described and claimed, and in order that it may be fully understood reference is to be had to the accompanying drawings, in which—

Figure 1:
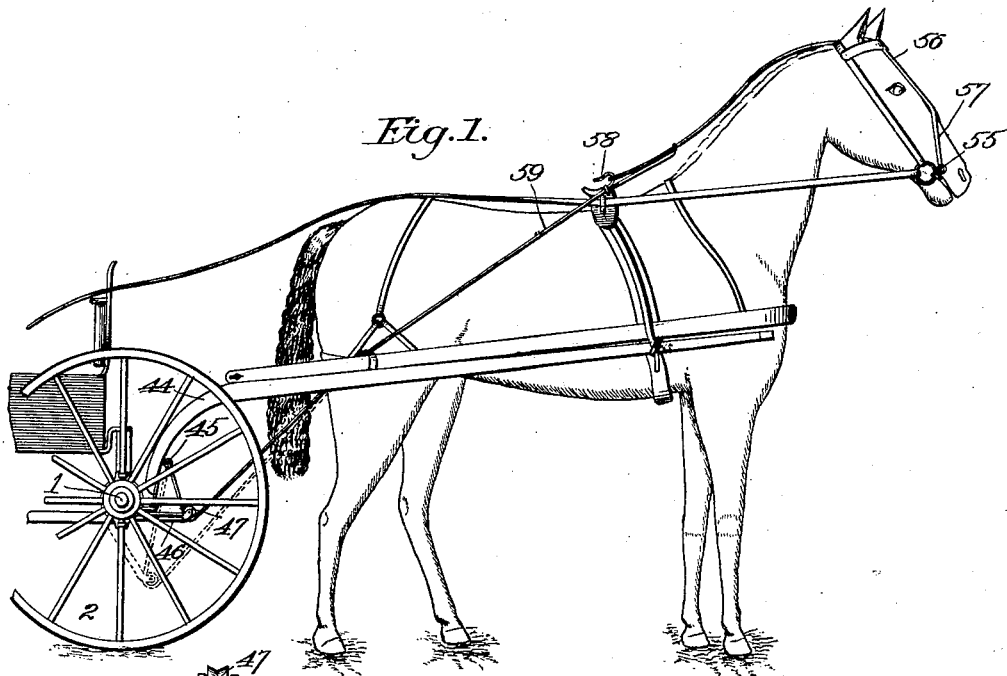
Figure 6:
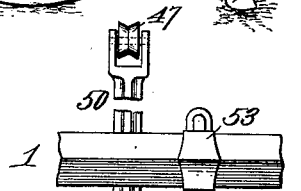
Figure 4:
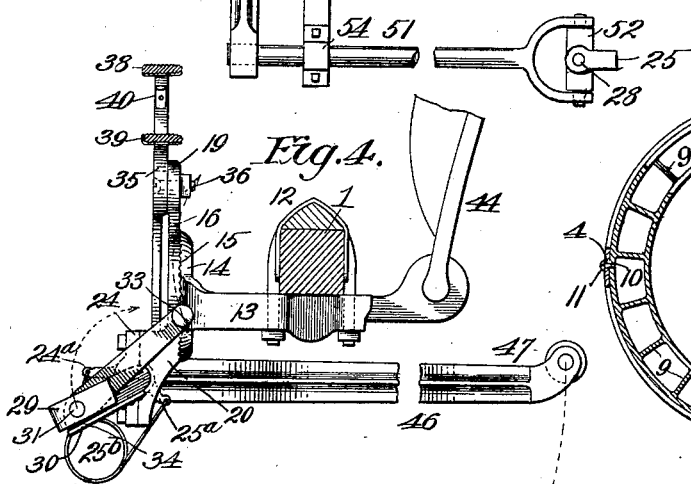
Figure 5:
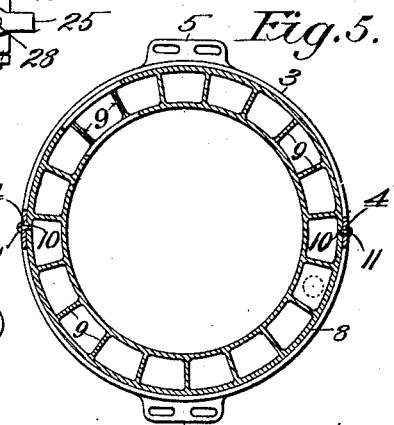

Figure 1 represents a side view of a part of a one-horse vehicle as equipped with my improved hitcher. Fig. 2 is an enlarged rear view of a portion of the hitching device as applied to the front axle of one of the wheels. Fig. 3 is a horizontal section taken on the line III III of Fig. 2. Fig. 4 is a vertical section taken on the line IV IV of Fig. 3. Fig. 5 is a section taken on line V V of Fig. 3. Fig. 6 is a detail view showing the apparatus as applied to a two-horse vehicle.

Referring now to the drawings, where like reference characters designate corresponding parts, 1 designates the front axle of the vehicle, and 2 one of the wheels thereof, preferably that at the right-hand side. Snugly embracing the inner portion of the hub is a clutch member. The outer band 3 is provided with a series of holes 4 and a pair of slotted lugs 5 at diametrically opposite points, said lugs fitting against the inner sides of the contiguous spokes of the wheel and receiving the legs of small clips 6, embracing said spokes, clamping-nuts 7 engaging the inner ends of the legs to rigidly and reliably secure the band in place. The inner band 8 of the clutch fits telescopically within band 3 and is provided with a plurality of radial arms or teeth 9 and an oblique series of holes 10, one of each series being adapted to register with one of the holes 4 of the outer or immovable band 3, bolts or pins 11 engaging said registering holes to lock the bands rigidly at the desired point of adjustment, and therefore accommodate hubs which vary in length inward of the spokes.

12 designates clips of the usual form engaging the axle as near the hub as practicable and in case of a single-horse vehicle, as shown in Figs. 1 to 4, at equal distances from the coupling of the thill hereinafter referred to.

13 designates a hanger of approximately U shape in plan view and provided centrally with a vertically-disposed disk portion 14 in the form of a rosette—that is, having its rear face radially serrated, as at 15, to engage the rosette portion of a triangular bracket 16— said hanger and bracket being clamped rigidly together by a bolt 17, extending through the rosette portions of said hanger and bracket, and a nut 18 engaging the bolt. The triangular-shaped bracket 16 embraces an upwardly-projecting central arm 19 and a pair of depending divergent arms 20 for purposes hereinafter explained, and secured to said last-named arms is a detent in the form of a spring 21, bent or crimped to provide two notches 22 and 23 a suitable distance apart.

24 designates bearing-caps bolted to the lower ends of arms 20 and forming in conjunction therewith bearings wherein shaft 25 may rotate and reciprocate, the shaft being provided with a forwardly-projecting arm $25^a$, held normally, as shown in Fig. 4, by the expansive spring 25ᵇ, attached at its opposite ends to said arm, and the cross-bar 24ᵃ, connecting bearing-caps 24. Said shaft between said bearings is provided with a pair of collars 26, at its inner end is bifurcated or forked, as shown at 27, and carries a bolt 28, connecting the arms of said bifurcated or forked portions, and at its outer end is provided with a crank 29, embracing parallel arms connected together at their outer ends, and a flat spring 30, secured to the lower edge of one of said arms and underlying the space between them. Pivotally mounted on pivot-bolt 31 of said crank-arm is a bar 32, provided with an outwardly-projecting pointed tooth 33 and a flattened lower edge 34, the latter being contiguous to the pivot-bolt and engaged by the spring 30, which exerts a yielding pressure against the under side of the bar for the purpose of holding the toothed end of the latter normally depressed, and in this connection it will be noticed that the bar fits snugly between the parallel arms of the crank, and therefore has an extended bearing thereon, which renders it capable of successfully resisting any lateral or twisting strain which may be imposed upon it.

35 designates a T-shaped lever mounted pivotally on clamping-bolt 36, carried by the upper arm 19 of bracket 16, the lower end of the stem of said lever being provided with a circular head 37, fitting snugly between collars 26 of shaft 25, and a rib 37ᵃ to play against the spring-detent and yieldingly interlock with notch 22 or notch 23 thereof, this arrangement serving to prevent the accidental operation of the lever from the jolting of the vehicle or any other cause. The head of said lever is provided at its opposite ends with roughened foot-plates 38 and 39, whereby the driver by foot-pressure effects the operation of the lever, assuming, of course, that the vehicle is of such type that said lever is within convenient reach. For runabouts and other vehicles where the driver is seated so high that he cannot conveniently reach said foot-plates the T-lever is provided with an upwardly-projecting perforated stud 40 to receive the socketed lower end of an extension-arm 41, having a foot-stirrup 42 at its upper end, the connection between the lever and its extension being rendered secure by means of a spring-cotter 43 or its equivalent extending through the socket portion and the perforations of said stud.

When the hitcher is used upon a single-horse vehicle, the thill or shaft 44 is coupled to the axle centrally between clips 12 in the usual or any preferred manner and is provided at its under side near its pivoted end with an eyebolt or equivalent device, as shown at 45. In this case also a lever 46, occupying normally a horizontal plane and projecting forwardly of the axle, has its free end vertically below the thill and provided with a grooved pulley 47 and is of such form that its rear end fits snugly in the bifurcation or fork of shaft 25 upon bolt 28 and is interlocked rigidly with said shaft by a pair of outwardly-projecting arms 48, embracing opposite sides of the shaft, an expansive spring 49 being interposed between the end of the shaft and the lever for the purpose of preventing the parts rattling in case of an imperfect fit due to wear or any other cause, the retention of said spring in position being insured by arms 48. Where the apparatus is employed in connection with two-horse vehicles, the lever 46, connected directly to shaft 25, is dispensed with and a lever 50 substituted therefor, the last-named lever being secured or formed at the inner end of a shaft extension 51, said extension being bifurcated at its outer end and universally joined to the similar end of shaft 25 by means of pivot-block 52, the outer end of the shaft extension being journaled in a bearing 54 at the rear end of a clip 53, secured to the axle, (see Fig. 6,) and in this case noise may be eliminated by employing one or more springs 49 (not shown) in the coupling. By means of this sectional shaft construction it is obvious that straight upwardly-curved or downwardly-curved axles can be accommodated equally well, the shaft extension extending practically parallel with the inner portion of the axle. In this connection it will also be understood that the formation or shape of axles of different vehicles vary greatly contiguous to the hub—some extend straight, as shown, and some bend upwardly and others downwardly. Where the axle bends upward or downward, it throws the inner clip 12 at an angle to its companion clip, and therefore disposes the hanger 13 at an angle with its inner end either higher or lower than its outer end, and for the reason that shaft 25 must extend horizontally to insure the proper operation of the clutch mechanism will be seen the necessity of an adjustable relation between said hanger and bracket 16 and also the need of means for securing the bracket reliably at the required adjustment. Thus when the hanger by reason of curvature in the axle extends upwardly or downwardly from its outer side by simply loosening clamping-bolt 17 by the proper manipulation of nut 18 the bracket can be adjusted to a vertical position and then reclamped in such position, the interlocking radial serrated face of the rosettes of the hanger and bracket serving to eliminate any possibility of slippage as long as the nut retains its position, and in this connection also it will be apparent that the abruptness of the bend in the axle occurring between the clips 12 will not interfere in the least with the hanger, for the reason that the latter is of skeleton form and its arms only underlie the axle. In other words, the bend of the axle may project between said arms either upwardly or downwardly and the hanger-arms bear squarely against the under side of the axle at opposite sides of said bent portion.

55 designates a supplemental bit fitting in the horse's mouth above his tongue and adapted to be pulled upwardly against that portion of the gums or roof of the mouth not provided with teeth, which portion is so tender that eighteen pounds' pressure, more or less, is sufficient to stop him even when running away. To the ends of this bit are attached the branch arms 57—one only of which appears—of a checkrein 56, and attached to the checkrein about eight inches, more or less, in advance of the check-hook 58 is a third rein 59, said rein extending down under the pulley 48 of lever 46 or 50 and up to the eyebolt 45 on the thill or to the tongue. (Not shown.) The object of this arrangement is to compound the pull by causing an eight-inch throw of the lever to effect a sixteen-inch back pull on the checkrein, as shown in dotted lines, Fig. 1, it being obvious that this is possible, because the checkrein is flexible and that the portion of it between the hook and the front end of the third rein bends and twists to permit the action described to take place. A horse has not yet been found which would not stop before the stroke of said lever was completed.

In actual practice, assuming that the parts are as shown in Figs. 1, 2, 3, and 4 and that the driver wishes to leave his horse with the assurance that he will find him there on his return, he stops at the point desired and, placing his foot in stirrup 42 or on foot-plate 38, according to the style of vehicle, depresses said plate. The depression of the plate of course effects the operation of the T-lever, of which it is a part, overcoming in such pressure the yielding resistance offered by the engagement of rib 37$^a$ with its notch 22 and through the engagement of stem-head 37 and collars 26 slides shaft 25, including its extension 51, (if a two-horse vehicle,) outward and causes the pointed tooth 33 of pivoted bar 32 to interlock with the clutch-collar, it being obvious that if the pointed end of said tooth should strike the beveled inner end of a radial arm or tooth 9 it would slip past the same, either through a slight rotary movement of the wheel or pivotal action on the part of the bar. With the parts interlocked as described the attempt of the horse to move forward would result in the rotation of the wheels and the consequent expansion of the toggle-joint constituted by the crank of shaft 25 and bar 32. The expansion of this toggle-joint incidentally effects the rotation of the shaft and the depression of the front end of lever 46 or 50, as the case may be, this movement being attended, as above explained, by a backward pull upon the third rein and an unbearable pressure imposed by the supplemental bit on a tender portion of the horse's mouth, which causes him to back, and thus recontract the toggle, raise shaft-lever 46 or 50, and loosen the third rein. When the driver resumes his seat, he oscillates the foot-lever in the opposite direction in an obvious manner to slide the shaft 25 inward and withdraw the inner clutch-band from engagement with the outer clutch-band, this action being instantly followed by that of spring 25$^b$, which rocks shaft 25, and thereby reëlevates lever 46 or 50 to its original position and ready to cause another back pull on the horse at the proper time.

Except where a horse has become absolutely unmanageable it is not desirable to check him by means of this apparatus, as its action is so sudden and powerful that the result may be serious not only to the horse, but the occupants of the vehicle as well.

From the above description it will be apparent that I have produced a horse-hitcher which, while embodying my preferred construction, is susceptible of change in its form, proportion, detail construction, or arrangement of the parts without departing from its spirit and scope.

Having thus described the invention, what I claim as new, and desire to secure by Letters Patent, is—

1. In a horse-hitcher, the combination of a vehicle, a clutch member secured to a wheel thereof, a rock-shaft having endwise movement and a crank, a toothed bar forming the other clutch member and pivoted to said crank and constituting in conjunction therewith a toggle, and means to move said rock-shaft endwise and cause said clutch members to interlock, substantially as described.

2. In a horse-hitcher, the combination of a vehicle, a clutch member secured to a wheel thereof, a rock-shaft having endwise movement and a crank, a toothed bar forming the other clutch member and pivoted to said crank and constituting in conjunction therewith a toggle, means to move said rock-shaft endwise and cause said clutch members to interlock, a lever attached to the rock-shaft, and a third rein attached at its rear end to said lever for the purpose of pulling back on the horse as he steps forward and turns the wheel, substantially as described.

3. In a horse-hitcher, the combination of a vehicle, a clutch member secured to a wheel thereof, comprising a stationary portion, a movable portion telescopically engaging the stationary portion, and means for securing them rigidly at the desired adjustment, a rock-shaft having endwise movement and a crank, a toothed bar forming the other clutch member and pivoted to said crank and constituting in conjunction therewith a toggle, and means to move said rock-shaft endwise and cause said clutch members to interlock, substantially as decribed.

4. In a horse-hitcher, the combination of a vehicle, a clutch member secured to a wheel thereof, comprising a stationary portion having a hole, a movable portion engaging the stationary portion telescopically and provided with a series of holes adapted to register with the hole of the stationary portion, and a pin or bolt engaging the registering holes to secure said members rigidly together, a rock-shaft having endwise movement and a crank, a toothed bar forming the other clutch member and pivoted to said crank and constituting in conjunction therewith a toggle, and means to move said rock-shaft endwise and cause said clutch members to interlock, substantially as described.

5. In a horse-hitcher, the combination of a vehicle, a clutch member secured to a wheel thereof, comprising a stationary portion or ring snugly embracing the hub, and provided with a hole and with perforated lugs, clips embracing the proximate spokes of the wheel and engaging and bolted to the perforated lugs, a movable member or ring engaging the first-named member telescopically and provided with a series of radial arms or teeth and an oblique series of holes, and a pin or bolt engaging the hole of the stationary member and the registering hole of the oblique series of the movable member, a rock-shaft having endwise movement and a crank, a toothed bar forming the other clutch member and pivoted to said crank and constituting in conjunction therewith a toggle, and means to move said rock-shaft endwise and cause said clutch members to interlock, substantially as described.

6. In a horse-hitcher, the combination of a vehicle, a clutch member secured to a wheel thereof, a hanger secured to the axle, a bracket clamped to the hanger, a rock-shaft mounted to slide and rotate in the bracket, a clutch member carried by the rock-shaft to engage the first-named clutch member, means to slide the shaft and cause such engagement, and means actuated by the movement of the wheel for pulling back upon the horse, substantially as described.

7. In a horse-hitcher, the combination of a vehicle, a clutch member secured to a wheel thereof, a rock-shaft having endwise movement and a crank, a toothed bar forming the other clutch member and pivoted to said crank and constituting in conjunction therewith a toggle, and a lever within convenient reach of the driver for moving said rock-shaft endwise in either direction, substantially as described.

8. In a horse-hitcher, the combination of a vehicle, a clutch member secured to a wheel thereof, a rock-shaft having endwise movement and a crank, a toothed bar forming the other clutch member and pivoted to said crank and constituting in conjunction therewith a toggle, a lever within convenient reach of the driver for moving said rock-shaft endwise in either direction, and means for yieldingly resisting the initial part of the shaft movement endwise in either direction, substantially as described.

9. In a horse-hitcher, the combination of a vehicle, a clutch member secured to a wheel thereof, a rock-shaft having endwise movement and a crank, a toothed bar forming the other clutch member and pivoted to said crank and constituting in conjunction therewith a toggle, a lever within convenient reach of the driver for moving said rock-shaft endwise in either direction, and an upward extension for said lever having a stirrup to receive the foot of the driver, substantially as described.

10. In a horse-hitcher, the combination of a vehicle, a clutch member secured to a wheel thereof, a hanger secured to the axle and provided with a rosette, a bracket having a rosette portion pivotally clamped to the rosette of the hanger, a rock-shaft mounted to slide and rotate in the bracket, a clutch member carried by the rock-shaft to engage the first-named clutch member, means to slide the shaft and cause such engagement, and means actuated by the movement of the wheel for pulling back upon the horse, substantially as described.

11. In a horse-hitcher, the combination of a vehicle, a clutch member secured to a wheel thereof, clips secured to the axle near said wheel, a hanger secured to said clips, a bracket mounted on the hanger, a lever mounted on the bracket, means to prevent the accidental movement of the lever, a rock-shaft carried by the bracket and engaged by the first-named lever and provided with a crank and a lever, a toothed bar pivoted to said crank and adapted under endwise movement of the rock-shaft to engage said clutch member, a spring engaging said bar and tending to depress its toothed end, and a third rein connected to the rock-shaft lever and adapted under the downward movement of the latter to exert a backward pull on the horse, substantially as described.

12. In a horse-hitcher, the combination of a vehicle, a clutch member secured to a wheel thereof, a rock-shaft having endwise movement and a crank, a toothed bar forming the other clutch member and pivoted to said crank, means to move said rock-shaft endwise to cause said clutch members to engage or become disengaged, a third rein connected to said crank and adapted to be pulled downwardly by the latter as the wheel moves forward and operates the rock-shaft when the clutch members are interlocked, and means for yieldingly resisting such movement and restoring said crank and rock-shaft to their original positions, when the clutch members are disengaged, substantially as described.

13. In a horse-hitcher, the combination of a vehicle, a clutch member secured to a wheel thereof, a rock-shaft having endwise movement and a crank, an extension for said rock-shaft and provided with a lever, a universal joint connecting said shaft and said extension, a toothed bar forming the other clutch member and pivoted to said crank, a third rein connected to said lever to pull back upon the horse, and means to move said rock-shaft endwise and cause said clutch members to interlock or become disengaged.

14. In a horse-hitcher, the combination of a vehicle, a clutch member secured to a wheel thereof, a rock-shaft having endwise movement and a crank, a toothed bar forming the other clutch member and pivoted to said crank, means to move said rock-shaft endwise and cause said clutch members to interlock or become disengaged, a lever actuated by the rotary movement of the rock-shaft, and a third rein engaging said lever slidingly and attached at its rear end to a fixed point on the vehicle above the lever.

15. In a horse-hitcher, the combination of a vehicle, a clutch member secured to a wheel thereof, a rock-shaft supported from the axle, a second clutch member carried by said rock-shaft and adapted to engage the first, a check-rein provided with a supplemental bit, a third rein attached to said check-rein at one end and to a fixed point on the vehicle at the other, and a lever carried by the rock-shaft and engaging said third rein slidingly at a point intermediate of its ends, substantially as described.

In testimony whereof I affix my signature in the presence of two witnesses.

JACK CALDWELL.

Witnesses:
M. R. REMLEY,
H. C. RODGERS.